(12) United States Patent
He

(10) Patent No.: US 9,798,914 B1
(45) Date of Patent: Oct. 24, 2017

(54) SYSTEM FOR AND METHOD OF EFFICIENTLY PROCESSING TARGETS TO BE ELECTRO-OPTICALLY READ BY IMAGE CAPTURE

(71) Applicant: SYMBOL TECHNOLOGIES, LLC, Lincolnshire, IL (US)

(72) Inventor: Duanfeng He, South Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/171,603

(22) Filed: Jun. 2, 2016

(51) Int. Cl.
*G06K 7/10* (2006.01)
*G06K 7/14* (2006.01)

(52) U.S. Cl.
CPC ....... *G06K 7/10732* (2013.01); *G06K 7/1447* (2013.01)

(58) Field of Classification Search
USPC .......................... 235/462.15, 462.32, 462.41
See application file for complete search history.

(56) References Cited

U.S. PATENT DOCUMENTS

| 5,524,068 A | * | 6/1996 | Kacandes | G06K 7/14 382/103 |
| 2007/0152061 A1 | * | 7/2007 | Blanford | G06K 7/10792 235/462.32 |

* cited by examiner

*Primary Examiner* — Rafferty Kelly
(74) *Attorney, Agent, or Firm* — Yuri Astvatsaturob

(57) ABSTRACT

A source image having a bit depth greater than eight is captured from a moving target. The source image is processed to obtain a plurality of target images each having a bit depth of eight. A memory stores the 8-bit target images. A processor obtains statistical data about the source image, and selects one of the stored 8-bit target images based on the statistical data. A controller efficiently decodes only the selected 8-bit target image.

17 Claims, 3 Drawing Sheets

SYSTEM FOR AND METHOD OF EFFICIENTLY PROCESSING TARGETS TO BE ELECTRO-OPTICALLY READ BY IMAGE CAPTURE

BACKGROUND OF THE INVENTION

The present disclosure relates generally to a system for, and a method of, efficiently processing targets, such as bar code symbols, to be electro-optically read by image capture, and, more particularly, to processing the symbols as they are being moved past at least one light-transmissive window of a point-of-transaction workstation.

Point-of-transaction workstations employing imager-based readers have been used in many diverse venues, such as supermarkets, department stores, libraries, factories, warehouses, and like environments, for many years. Such workstations were often configured either as stand-mounted scanners each having a window; or as vertical slot scanners each having a generally vertical window; or as flat-bed or horizontal slot scanners each having a generally horizontal window; or as bioptical, dual-window scanners each having both a generally horizontal window and a generally vertical window. Such workstations were often operated to electro-optically read a plurality of symbol targets, such as one-dimensional symbols, particularly Universal Product Code (UPC) bar code symbols, truncated symbols, stacked symbols, and two-dimensional symbols, as well as non-symbol targets, such as driver's licenses, etc., the targets being associated with, or borne by, objects or products to be processed by, e.g., purchased at, the workstations.

A user, such as an operator or a customer, slid or swiped a product associated with, or bearing, the target in a moving direction across and past a respective window in a swipe mode, or momentarily steadily held the target at an approximate central region of the respective window in a presentation mode. The products could be moved relative to the respective window in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. The choice depended on the type of the workstation, or on the user's preference, or on the layout of the venue, or on the type of the product and target. Return light returning from the target over a large working range of distances to the imager-based reader was captured by a solid-state imager in one or more images over a field of view, and then processed, and, when the target was a symbol, was decoded, and read, thereby identifying the product.

Although generally satisfactory for their intended purpose, one issue with such known workstations involved the fact that if the target was swiped very quickly across the window, then the target might only remain in the field of view of the solid-state imager for just one frame. To reliably capture such an image over a large working range, the solid-state imager was configured to capture the image with a high bit depth, e.g., greater than eight. Some imagers can capture images with 9, 10, 12, 14, 16, and more bit depths. The bit depth is the number of bits, i.e., digits 1 and 0, which are used to represent a tonal value or brightness of each pixel in the image. An 8-bit image, for example, is represented by 256 brightness values, and a 9-bit image is represented by 512 brightness values. Yet, images with bit depths over eight require a greater amount of processing power and time as compared to 8-bit images, thereby often slowing and degrading the reading performance.

Accordingly, there is a need to enhance, and to render more efficient, the overall reading performance of imager-based workstations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
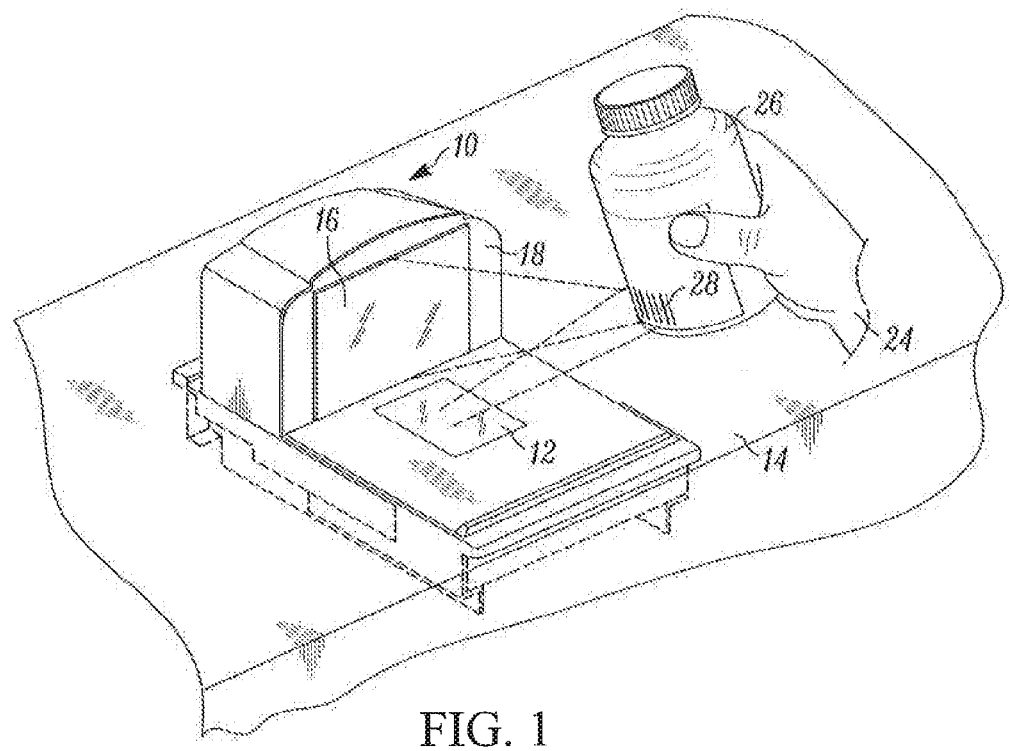
FIG. 1 is a perspective view of a bioptical workstation for electro-optically reading by image capture targets on products moving through the workstation.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system, workstation, and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates, in accordance with one aspect, to a system for efficiently processing targets, such as bar code symbols, to be electro-optically read by image capture. The system includes a workstation having at least one light-transmissive window past which a target is moved during image capture, and an imaging assembly supported by the workstation for imaging the target to capture a source image having a bit depth greater than eight. A programmed processor, e.g., an application-specific integrated circuit (ASIC) or a field-programmable gate array (FPGA), processes the source image to obtain a plurality of target images each having a bit depth of eight, and a memory is accessible to the processor for storing the plurality of 8-bit target images. For example, the processor can process the source image by using a first set of eight bits from the source image to obtain a first 8-bit target image, and a second set of eight bits from the source image to obtain a second 8-bit target image.

The processor also obtains statistical data about the source image. For example, the processor can generate a histogram from the source image having a set of bins in which tonal values are collected. The processor selects one of the stored 8-bit target images based on the statistical data, e.g., the histogram, obtained by the processor. The processor can select the one of the stored 8-bit target images based on the tonal values in a subset of the bins.

A programmed controller decodes only the selected one of the stored 8-bit target images. The processing of the target is thus rendered more efficient, because less processing power and time are required to process an 8-bit image as compared to the image whose bit depth is greater than eight that is generated by the imager.

A method, in accordance with another aspect of this disclosure, of efficiently processing targets to be electro-optically read by image capture, is performed by moving a target past a light-transmissive window of a workstation during image capture, by imaging the target to capture a source image having a bit depth greater than eight, by processing the source image to obtain a plurality of target images each having a bit depth of eight, by storing the plurality of 8-bit target images, by obtaining statistical data about the source image, by selecting one of the stored 8-bit target images based on the statistical data, and by decoding only the selected one of the stored 8-bit target images.

Figure 2:
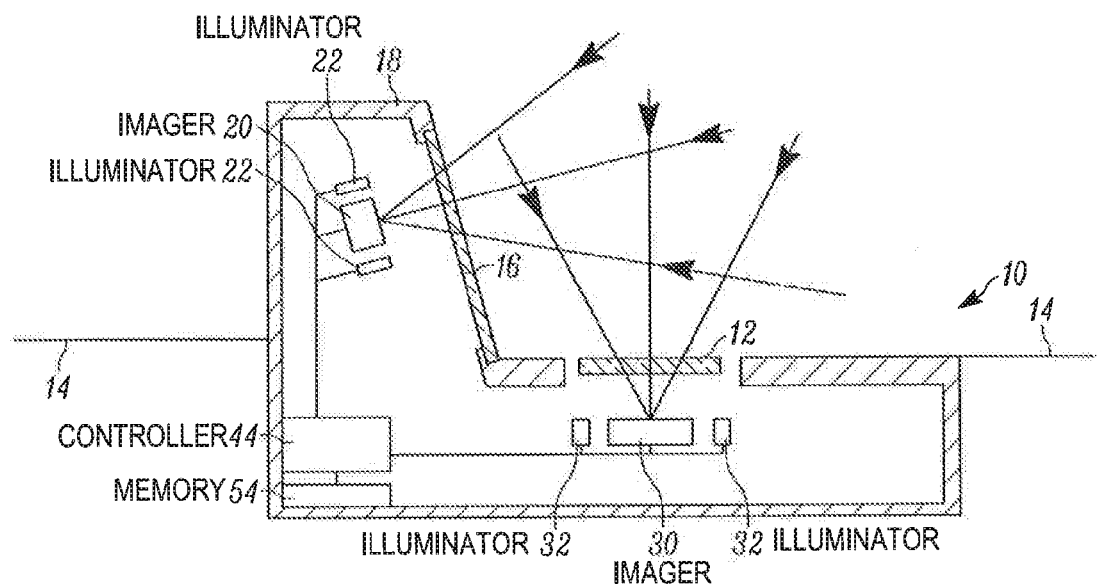
FIG. 2 is a schematic diagram depicting some components of the workstation of FIG. 1.

Turning now to the drawings, FIGS. 1-2 depict a dual window, bioptical, point-of-transaction workstation 10 situated at a counter 14. Although a bioptical workstation has been illustrated, it will be understood that other types of workstations, including any of the above-described workstations having at least one window, could be employed. The workstation 10 is used by retailers at the checkout counter 14 to process transactions involving the purchase of products 26 bearing, or associated with, an identifying target, such as the UPC barcode symbol 28 described above. As best seen in FIGS. 1-2, the workstation 10 has a generally horizontal, light-transmissive window 12 elevated, or set flush with, a top surface of the respective counter 14, and a vertical or generally vertical, i.e., tilted, (referred to as "upright" hereinafter) light-transmissive window 16 set flush with, or recessed into, a raised housing portion 18 above the counter 14.

As schematically shown in FIG. 2, an imaging assembly advantageously includes a first camera or solid-state imager 20 located behind the upright window 16, and a second camera or solid-state imager 30 located behind the horizontal window 12. Each imager 20, 30 is a solid-state device, for example, a charge coupled device (CCD) or a complementary metal-oxide-semiconductor (CMOS) device and has a linear or area array of addressable image sensors or pixels, preferably of submegapixel or supermegapixel size, having a field of view that diverges away from its associated window in both horizontal and vertical directions. The imagers 20, 30 have respective illuminators 22, 32 to uniformly illuminate the symbol 28. The imagers 20, 30 are operative for capturing return illumination light passing through either or both windows 12, 16 from the symbol 28 on the product 26.

In use, a user 24, such as a clerk or a customer, processes each product 26 bearing the symbol 28 thereon, past the windows 12, 16 by swiping the product 26 across a respective window, or by presenting the product 26 by holding it momentarily steady at the respective window. The symbol 28 may be located on any of the top, bottom, right, left, front and rear, sides of the product, and at least one, if not more, of the imagers 20, 30 will capture the illumination light reflected, scattered, or otherwise returning from the symbol 28 through one or both windows 12, 16 as one or more images.

The imagers 20, 30 and the associated illuminators 22, 32 are operatively connected to a programmed workstation microprocessor or controller 44 operative for controlling the operation of these and other components. Preferably, the controller 44 is tasked with processing the return light scattered from the symbol 28, and with decoding the captured image of the return light. A memory 54 is operatively bidirectionally connected to the controller 44. In operation, the controller 44 sends control signals to energize the illuminators 22, 32 for a short time period of, for example, 500 microseconds or less, and to energize the imagers 20, 30 to collect illumination light reflected and/or scattered from the symbol 28 substantially only during said time period. A typical imager needs about 16-33 milliseconds to read the entire target image and operates at a frame rate of about 30-90 frames per second.

As previously explained, when the target 28 was swiped very quickly across the window 12, 16, then the target 28 might only remain in the field of view of the solid-state imager 20, 30 for just one frame. To reliably capture such a moving image over a large working range, the solid-state imager 20, 30 was configured to capture the image with a high bit depth, e.g., greater than eight bits. By way of example, reference numeral 60 in FIG. 3 identifies a 9-bit source image generated by at least one of the imagers 20, 30. If this 9-bit source image 60 were to be directly processed by the controller 44, and then decoded, a relatively large amount of processing power and time would be required, at least when compared to the processing and time needed to process an 8-bit image. This disclosure is addressed to reducing such processing power and time, and to render the overall reading performance more efficient.

Figure 3:
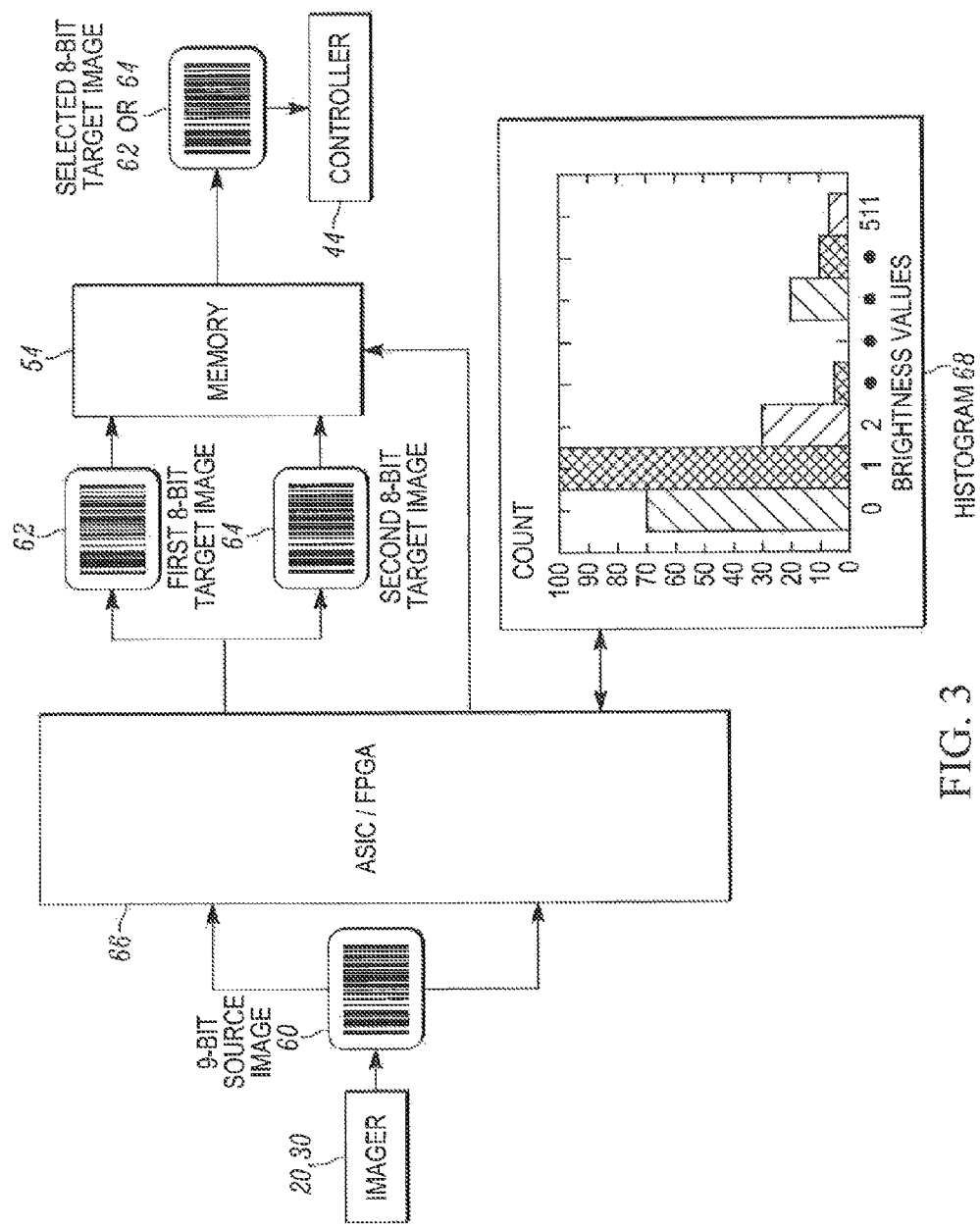
FIG. 3 is a diagram depicting a preferred embodiment that explains how the targets are efficiently processed by the workstation of FIG. 1 in accordance with the present disclosure.

In accordance with this disclosure, and as best shown in FIG. 3, a processor 66, e.g., an application-specific integrated circuit (ASIC) or a field-programmable gate array (FPGA), processes the 9-bit source image 60 to obtain a plurality of target images each having a bit depth of eight, e.g., a first 8-bit target image 62 and a second 8-bit target image 64. The processor 66 then stores both 8-bit target images 62, 64 in the memory 54. For example, the 9-bit source image 60 is generated using bits 0 through 8, in which case, a first set of eight bits from the 9-bit source image 60, e.g., bits 0 through 7, are used to obtain the first 8-bit target image 62, and a second set of eight bits from the 9-bit source image 60, e.g., bits 1 through 8, are used to obtain the second 8-bit target image 64.

The processor 66 is also operative for obtaining statistical data about the source image 60, preferably simultaneously with the generating and storing of both the 8-bit target images 62, 64. By way of example, the processor 66 can generate a histogram 68 from the 9-bit source image 60 having a set of bins in which tonal or brightness values are collected. For example, for the 9-bit source image, there are 512 bins ranging from bin 0 to bin 511. The processor 66 selects one of the stored 8-bit target images 62, 64 based on the statistical data, or histogram 68, and the controller 44 decodes only the selected one of the stored 8-bit target images, i.e., either the first 8-bit target image 62 or the second 8-bit target image 64. As explained above, the processing of the target 28 is thus rendered more efficient, because less processing power and time are required to process either the selected 8-bit target image 62 or 64, as compared to processing the 9-bit source image 60. Of course, if the source image 60 has more than 9 bits, then the resulting efficiency in processing the target is even greater.

The histogram 68 is plotted in FIG. 3, with 512 bins arranged horizontally between bin 0 and bin 511, and with the normalized frequency or count of the brightness values arranged vertically. The upper half, i.e. bins 256-511, of the histogram, as illustrated, shows significant brightness values, thus indicating that the image is approximately properly exposed, and that the better target image to be decoded is the first 8-bit target image 62 that uses bits 0 through 7. Otherwise, if the image is generally dark, as represented by a histogram whose upper half has mostly zero values, then the better target image to be decoded is the second 8-bit target image 64 that uses bits 1 through 8. Thus, the processor 66 selects the one of the stored 8-bit target images 62 or 64 based on the tonal values in a subset of the bins, e.g., the bins 256-511.

Figure 4:
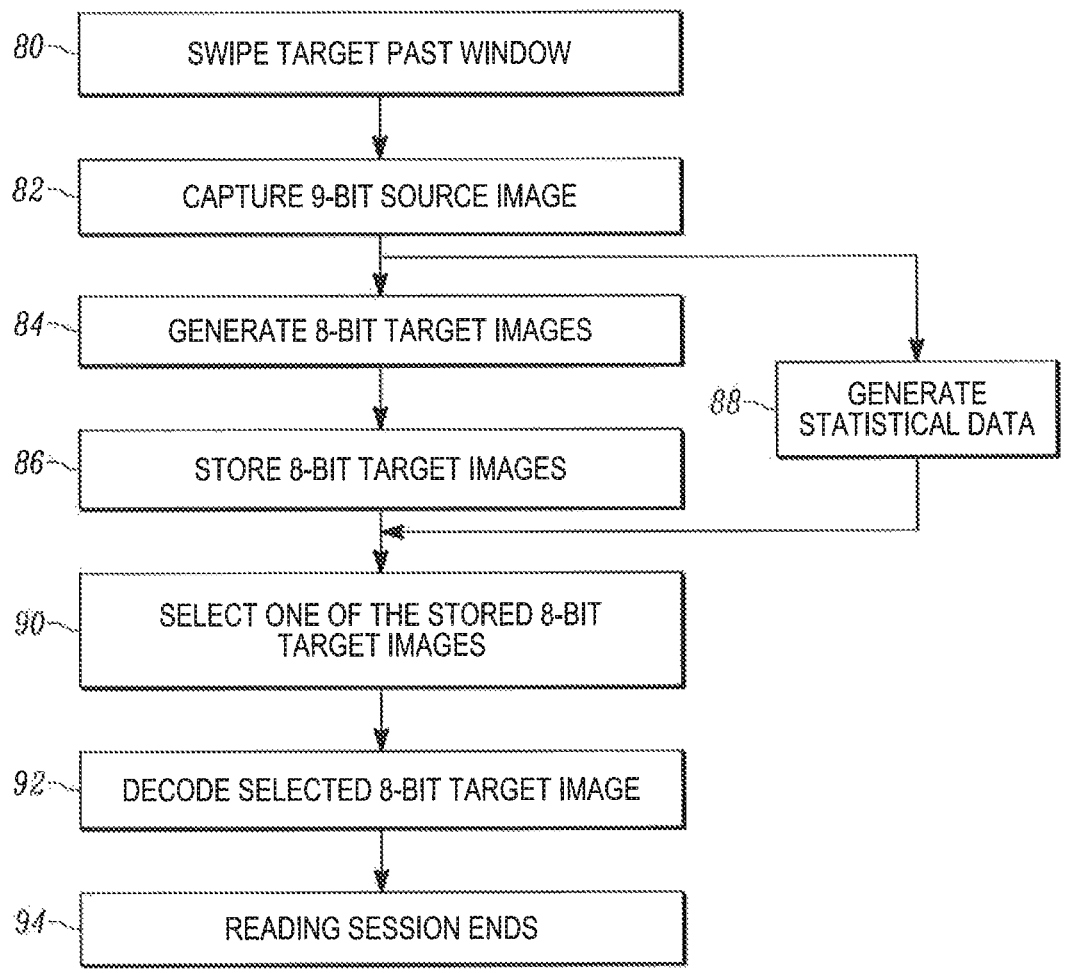
FIG. 4 is a flow chart depicting steps performed in accordance with the method of the present disclosure.

The flow chart of FIG. 4 sets forth the steps in performing the above-disclosed method of efficiently processing targets 28 to be electro-optically read by image capture. In step 80, a reading session begins when the target 28 is swiped past one or both of the windows 12, 16 of the workstation 10 during image capture. In step 82, the target 28 is imaged by one or both of the imagers 20, 30 to capture a source image 60 having a bit depth greater than eight. In step 84, the source image 60 is processed by the processor 66 to obtain a plurality of target images 62, 64 each having a bit depth of eight. In step 86, the 8-bit target images 62, 64 are stored in the memory 54. In step 88, statistical data, e.g., the histogram 68, about the source image 60 is generated by the processor 66. The step 88 is performed simultaneously with the steps 84 and 86. In step 90, the processor 66 selects either the stored 8-bit target image 62 or the stored 8-bit target image 64 based on the statistical data 68. In step 92, the controller 44 decodes only the selected one of the stored 8-bit target images 62 or 64. In step 94, the reading session ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for processing targets electro-optically read by image capture, the system comprising:
   a workstation having a light-transmissive window past which a target is moved during image capture;
   an imaging assembly supported by the workstation, the imaging assembly configured to image the target to capture a source image having a bit depth greater than eight;
   a memory;
   a processor configured to:
      process the source image to obtain a plurality of 8-bit target images each corresponding to a different subset of the source image;
      store the plurality of 8-bit target images in the memory;
      generate statistical data representative of different portions of the source image; and select one of the stored 8-bit target images based on the statistical data; and
a controller configured to decode only the selected one of the stored 8-bit target images.

2. The system of claim 1, wherein the window is supported to lie in a generally horizontal plane, and the imaging assembly includes a solid-state imager positioned within the workstation behind the window.

3. The system of claim 2, the workstation comprising a second light-transmissive window supported by the workstation to lie in a generally upright plane, and the imaging assembly comprising a second solid-state imager situated within the workstation behind the second window.

4. The system of claim 1, wherein the processor is configured to process the source image by using a first set of eight bits from the source image to obtain a first one of the 8-bit target images, and by using a second set of eight bits from the source image to obtain a second one of the 8-bit target images, the first set being different from the second set.

5. The system of claim 1, wherein the statistical data is a distribution having a set of bins in which tonal values of the source image are collected, and the processor is configured to select the one of the stored 8-bit target images based on the tonal values in a subset of the bins.

6. The system of claim 1, wherein the processor is configured to generate the statistical data concurrently with obtaining and storing the plurality of 8-bit target images.

7. The system of claim 1, wherein the processor is one of an application-specific integrated circuit (ASIC) and a field-programmable gate array (FPGA).

8. A system for processing targets electro-optically read by image capture, comprising:
a workstation having a pair of light-transmissive windows past which a target is moved during image capture, one of the windows lying in a generally horizontal plane, and another of the windows lying in a generally upright plane;
an imaging assembly having a pair of solid-state imagers supported by, and situated within, the workstation behind the windows, at least one of the imagers configured to image the target to capture a source image having a bit depth greater than eight;
a memory;
a processor configured to:
process the source image to obtain a plurality of target images each having a bit depth of eight and each target image corresponding to a different set of eight bits from the bit depth;
store the plurality of 8-bit target images in the memory;
generate statistical data representative of a distribution of tonal values in the source image;
select one of the stored 8-bit target images based on the statistical data; and
a controller configured to decode only the selected one of the stored 8-bit target images.

9. The system of claim 8, wherein the processor is configured to process the source image by using a first set of eight bits from the bit depth of the source image to obtain a first 8-bit target image, and by using a second set of eight bits from the bit depth of the source image to obtain a second 8-bit target image, wherein the first set is different than the second set.

10. The system of claim 8, wherein the processor is configured to generate the statistical data concurrently with obtaining and storing the plurality of 8-bit target images.

11. The system of claim 8, wherein the processor is one of an application-specific integrated circuit (ASIC) and a field-programmable gate array (FPGA).

12. A method of processing targets electro-optically read by image capture, the method comprising:
in response to a target moving past a light-transmissive window of a workstation during image capture, imaging the target to capture a source image having a bit depth greater than eight;
processing the source image to obtain a plurality of target images each having a bit depth of eight and each target image corresponding to a different set of eight bits from the bit depth;
storing the plurality of 8-bit target images;
generating statistical data about the source image;
selecting one of the stored 8-bit target images based on the statistical data; and
decoding only the selected one of the stored 8-bit target images.

13. The method of claim 12, further comprising supporting the window on the workstation to lie in a generally horizontal plane.

14. The method of claim 13, further comprising supporting a second light-transmissive window to lie in a generally upright plane.

15. The method of claim 12, wherein processing the source image comprises using a first set of eight bits from the bit depth of the source image to obtain a first 8-bit target image, and using a second set of eight bits from the bit depth of the source image to obtain a second 8-bit target image, wherein the first set is different than the second set.

16. The method of claim 12, wherein the statistical data is a distribution having a set of bins in which tonal values are collected, and selecting the one of the stored 8-bit target images is based on the tonal values in a subset of the bins.

17. The method of claim 12, further comprising obtaining and storing the plurality of 8-bit target images concurrently with generating the statistical data.

* * * * *